(12) United States Patent
Roberts et al.

(10) Patent No.: US 7,756,421 B2
(45) Date of Patent: Jul. 13, 2010

(54) ELECTRICAL DOMAIN COMPENSATION OF NON-LINEAR EFFECTS IN AN OPTICAL COMMUNICATIONS SYSTEM

(75) Inventors: Kim B. Roberts, Nepean (CA); Leo Strawczynski, Ottawa (CA); Maurice S. O'Sullivan, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 917 days.

(21) Appl. No.: 10/405,236

(22) Filed: Apr. 3, 2003

(65) Prior Publication Data

US 2004/0197103 A1 Oct. 7, 2004

Related U.S. Application Data

(63) Continuation-in-part of application No. 10/262,944, filed on Oct. 3, 2002, now Pat. No. 7,382,984.

(51) Int. Cl.
 *H04B 10/00* (2006.01)
(52) U.S. Cl. ........................ 398/158; 398/162
(58) Field of Classification Search ................ 398/159, 398/193, 194, 195
 See application file for complete search history.

(56) References Cited

U.S. PATENT DOCUMENTS

| | | | | |
|---|---|---|---|---|
| 5,060,310 A | * | 10/1991 | Frisch et al. | 398/193 |
| 5,148,503 A | | 9/1992 | Skeie | 385/3 |
| 5,291,289 A | * | 3/1994 | Hulyalkar et al. | 348/723 |
| 5,311,346 A | | 5/1994 | Haas et al. | 359/156 |
| 5,349,312 A | | 9/1994 | Huettner et al. | |
| 5,408,498 A | | 4/1995 | Yoshida | 375/286 |
| 5,416,626 A | | 5/1995 | Taylor | 359/156 |
| 5,446,574 A | | 8/1995 | Djupsjobacka et al. | |
| 5,513,029 A | | 4/1996 | Roberts | 359/177 |
| 5,579,328 A | | 11/1996 | Habel et al. | 372/31 |

(Continued)

FOREIGN PATENT DOCUMENTS

EP 0 524 758 1/1993

(Continued)

OTHER PUBLICATIONS

Sadhwani, Ram et al "Adaptive CMOS Predistortion Linearizer for Fiber-Optic Links", Journal of Lightwave Technology, Dec. 2003, pp. 3180-3193, vol. 21, No. 12., U.S.A.

(Continued)

*Primary Examiner*—Shi K Li
(74) *Attorney, Agent, or Firm*—Kent Daniels; Blake, Cassels & Graydon LLP (57) ABSTRACT

Nonlinearity-induced signal distortions are compensated by processing an input communications signal, in the electrical domain prior to Electrical-to-optical conversion and transmission through an optical link of a communications system. According to the invention, a compensation operator is determined that substantially mitigates the nonlinearity-induced signal distortions imparted to an optical signal traversing the communications system. The input communications signal is then input to the compensation operator to generate a predistorted electrical signal. This predistorted electrical signal is then used to modulate an optical source to generate a corresponding predistorted optical signal for transmission through the optical communications system. With this arrangement, arbitrary nonlinearity-induced signal distortions imparted by the optical link can be compensated in such a manner that a comparatively undistorted optical signal is obtained at the receiving end of the optical link.

24 Claims, 7 Drawing Sheets

U.S. PATENT DOCUMENTS

| | | | | |
|---|---|---|---|---|
| 5,761,225 | A | 6/1998 | Fidric et al. | 372/6 |
| 5,892,858 | A | 4/1999 | Vaziri et al. | 385/2 |
| 5,949,560 | A | 9/1999 | Roberts et al. | 359/110 |
| 5,999,258 | A | 12/1999 | Roberts | 356/345 |
| 6,067,180 | A | 5/2000 | Roberts | 359/181 |
| 6,115,162 | A | 9/2000 | Graves et al. | 359/173 |
| 6,124,960 | A * | 9/2000 | Garthe et al. | 398/194 |
| 6,128,111 | A | 10/2000 | Roberts | 359/110 |
| 6,205,262 | B1 | 3/2001 | Shen | 385/11 |
| 6,262,834 | B1 | 7/2001 | Nichols et al. | 359/301 |
| 6,304,369 | B1 | 10/2001 | Piehler | 359/337.4 |
| 6,441,932 | B1 | 8/2002 | Helkey | 359/110 |
| 6,473,013 | B1 | 10/2002 | Velazquez et al. | 341/120 |
| 6,529,305 | B1 * | 3/2003 | Meeker et al. | 398/158 |
| 6,559,994 | B1 * | 5/2003 | Chen et al. | 398/182 |
| 6,580,532 | B1 | 6/2003 | Yao et al. | 359/111 |
| 6,889,060 | B2 * | 5/2005 | Fernando et al. | 455/561 |
| 7,020,402 | B2 * | 3/2006 | Shanbhag et al. | 398/181 |
| 2001/0028760 | A1 | 10/2001 | Yaffe | |
| 2002/0018268 | A1 | 2/2002 | Price et al. | |
| 2002/0024694 | A1 | 2/2002 | Newell et al. | |
| 2002/0039211 | A1 * | 4/2002 | Shen et al. | 359/110 |
| 2002/0106148 | A1 | 8/2002 | Schemmann et al. | |
| 2002/0135840 | A1 * | 9/2002 | Spagnoletti et al. | 359/128 |
| 2003/0011847 | A1 | 1/2003 | Dai et al. | |
| 2003/0072356 | A1 * | 4/2003 | Abraham et al. | 375/148 |
| 2004/0032912 | A1 * | 2/2004 | Ocenasek et al. | 375/297 |
| 2004/0247042 | A1 * | 12/2004 | Sahlman | 375/297 |

FOREIGN PATENT DOCUMENTS

| | | |
|---|---|---|
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Andre, P.S. et al "Extraction of DFB Laser Rate Equations Parameters for Optical Simulation Purposes", Conftele 99 ISBN 972-98115-0-4, pp. 561-564.

Illing, Lucas et al "Shaping current waveforms for direct modulation of semiconductor lasers", Institute for Nonlinear Science, 2003, San Diego, U.S.A.

Watts, P.M. et al "Demonstration of Electrical Dispersion Compensation of Single Sideband Optical Transmission", Optical Networks Group, Dept. of Electronic and Electrical Engineering, University College London, Torrington Place, London.

Kim, Hoon et al "10 Gbit/s 177 km transmission over conventional singlemode fibre using a vestigial side-band modulation format", Electronics Letters, Dec. 6, 2001, pp. 1533-1534, vol. 37, No. 25.

Bulow, Henning et al "Dispersion Mitigation Using a Fiber-Bragg-Grating Sideband Filter and a Tunable Electronic Equalizer", WDD34, pp. 1-4.

Sieben, M. et al "10Gbit/s optical single sideband system", Electronics Letters, May 22, 1997, pp. 971-973, vol. 33, No. 11.

Schaffer, Troy A. et al "A 2GHz 12-bit Digital-to-Analog Converter for Direct Digital Synthesis Applications", GaAs IC Symposium, pp. 61-64.

Kamoto, T. et al "An 8-bit 2-ns Monolithic DAC", IEEE Journal of Solid-State Circuits, Feb. 1988, vol. 23, No. 1.

Feldhaus, G: "Volterra Equalizer for Electrical for Electrical Compensation of Dispersion and Fiber Nonlinearities", Journal of Optical Communications, Fachverlag Schiele & Schon, Berlin, De, vol. 23, No. 3, Jun. 2002, pp. 82-84, XP001130377, ISSN: 0173-4911.

H. Gysel et al. "Electrical Predistortion to Compensate for Combined Effect of Laser Chirp and Fibre Dispersion", Electronics Letters IEE Stevenage vol. 27, No. 5, Feb. 1991.

A. Mecozzi et al. "Cancellation of timing and Amplitude Jitter in Symmetric Links Using Highly Dispersed Pulses", IEEE Photonics Technology Letters, vol. 13, No. 5, May 2001.

Thomas L. Koch, et al.; "Dispersion Compensation by Active Predistorted Signal Synthesis"; Journal of Lightwave Technology, vol. LT-3, No. 4, Aug. 1985.

Shigeki Watanabe, et al.; "Exact Compensation for both Chromatic Dispersion and Kerr Effect . . . " Journal of Lightwave Technology, vol. 14, No. 3, Mar. 1996.

Adaptive Electronic Linearization of Fiber Optic Links, OFC 2003, vol. 2, pp. 477-480, Mar. 2003 Sadhwani et al.

Automated Measurement of Polarization Mode Dispersion Using Jones Matrix Eigenanalysis, IEE Photonics Technology Letters, vol. 4, No. 9, pp. 1066-1069, Sep. 1992, Heffner.

Chromatic Dispersion Mapping by Sensing the Power Distribution of Four-Wave Mixing Along the Fiber Using Brillouin Probing, OFC 2003, vol. 2, pp. 714-716, Herraez et al.

Design of Broad-Band PMD Compensation Filters, IEEE Photonics Technology Letters, vol. 14, No. 8, Aug. 2002, A. Eyal et al.

Dispersion Compensation with an SBS-Suppressed Fiber Phase Conjugator Using Synchronized Phase Modulation, OFC 2003, vol. 2, pp. 716-717, M. Tani.

Electrical Signal Processing Techniques in Long-Haul Fiber-Optic Systems, 1990 IEEE-Transactions on Communications, vol. 38, No. 9, Jack H. Winters, et al.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Scott et al.

Measurement of High-Order Polarization Mode Dispersion, IEEE Photonics Technology Letters, vol. 12, No. 7, Jul. 2000, Yi Li et al.

Mitigation of Dispersion-Induced Effects Using SOA in Analog Optical Transmission, IEEE Photonics Technology Letters, vol. 14, No. 8, Aug. 2002, Duk-Ho Jeon et al.

Performance of Smart Lightwave Receivers With Linear Equalization, Journal of Lightwave Technology, vol. 10, No. 8, Aug. 1992, John C. Cartledge, et al.

Polarization Effects in Lightwave Systems, Craig. D. Poole and Jonathan Nage. Date unknown.

Polarization Modulated Direct Detection Optical Transmission Systesm, Journal of Lightwave Technology, vol. 10, No. 12, Dec. 1992.

Predistortion of Electroabsorption Modulators for Analog CATV Systems at 1.55 •m, Journal of Lightwave Technology, vol. 15, No. 9, Sep. 1997, Gordon C. Wilson et al.

Predistortion Techniques for Linearization of External Modulators, 1999 IEEE—Gordon Wilson, Lucent Technologies, NJ 07733, U.S.A.

Reduction of Dispersion-Induced Distortion in SCM Transmission Systems by Using Predistortion-Linearized MQW-EA Modulatirs, Journal of Lighwave Technology, vol. 15, No. 2, Feb. 1997, T. Iwai et al.

Representation of Second-Order Polarisation Mode Dispersion, Electronics Letters, vol. 35, No. 19, Sep. 16, 1999, A. Eyal et al.

Signal Distortion and Noise in AM-SCM Transmission Systems Employing the Feedfrorward Linearized MQW-EA External Modulator, Journal of Lightwave Technology, vol. 15, No. 8, Aug. 1995, T. Iwai et al.

Soliton Transmission Using Periodic Dispersion Compensation, Journal of Lightwave Technology, vol. 15, No. 10, Oct. 1997, Nicholas J. Smith et al.

Theoretical Basis of Polarization Mode Dispersion Equalization up to the Second Order, Journal of Lightwave Technology, vol. 18, No. 4, Apr. 2000, Teruhiko Kudou et al.

* cited by examiner

ELECTRICAL DOMAIN COMPENSATION OF NON-LINEAR EFFECTS IN AN OPTICAL COMMUNICATIONS SYSTEM

CROSS-REFERENCE TO RELATED APPLICATIONS

This application is a Continuation-in-Part of U.S. patent application Ser. No. 10/262,944 filed Oct. 3, 2002 now U.S. Pat. No. 7,382,984.

MICROFICHE APPENDIX

Not Applicable.

TECHNICAL FIELD

The present invention relates to optical communications systems, and in particular to electrical domain compensation of Four Wave Mixing, SPM, XPM and optical cross-talk in an optical communications system.

BACKGROUND OF THE INVENTION

Optical communications systems typically include a pair of network nodes connected by an optical waveguide (i.e., fiber) link. Within each network node, communications signals are converted into electrical signals for signal regeneration and/or routing, and converted into optical signals for transmission through an optical link to another node. The optical link between the network nodes is typically made up of multiple concatenated optical components, including one or more (and possibly 20 or more) optical fiber spans (e.g., of 40-150 km in length) interconnected by optical amplifiers.

In modern optical communications networks, it is generally desirable to transmit optical signals at high power levels in order to maintain sufficient signal to noise ratios over extended transmission distances, and thereby obtain an acceptably low Bit Error Rate (BER) in a received optical signal. However, conventional optical fibres comprise an optical transmission medium which exhibits nonlinear effects at high optical power levels, resulting in degradation of the optical signal. These nonlinear effects are generally a function of optical power, and so any increase in transmission power level tends to increase signal degradations due to system nonlinearities. Nonlinear effects may similarly occur within optical terminals of the system, in optical transmission media or in components such as optical amplifiers. The optimum power level at which optical signals can be transmitted is typically the maximum power level at which significant degradation due to nonlinearity is avoided. Since the performance of various optical components within the system varies with operating conditions, age, and component replacement, a safety margin is used in setting the maximum power level. Consequently, optical communications systems typically operate at power levels which are less than the optimum power level. A detailed discussion of nonlinear optical effects is provided by Agrawal, Govind P., "Nonlinear Fiber Optics", $2^{nd}$. Ed., Academic Press, Inc., San Diego, Calif., 1995 (ISBN 0-12-045142-5).

Of particular concern in considering nonlinear processes are the effects of phase nonlinearities, which increase as data rates and optical power levels increase, and which ultimately limit both system performance and signal reach.

Phase nonlinearities are the result of complex interactions between the optical power present in the fiber, the refractive index of the fiber medium, the wavelength-division-multiplexing (WDM) channel spacing, the polarization states of the signals within each of the channels, and the proximity of channel wavelengths to the zero-dispersion wavelength of the fiber. Phase nonlinearities include self-phase modulation (SPM), cross-phase modulation (XPM), and modulation-instability (MI), all of which are discussed in detail in Agrawal (supra), at chapters 4 and 7.

Figure 1A:
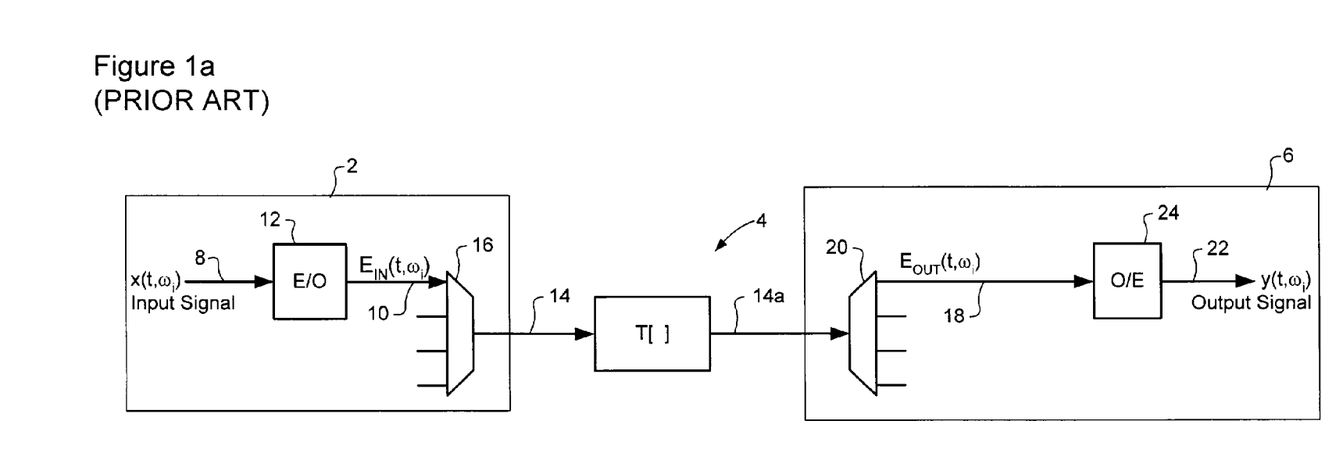
FIGS. 1a and 1b are block diagrams schematically illustrating operations of a conventional optical communications system.

As shown in FIG. 1a, a conventional optical communications system may conveniently be represented by a transmitter 2 and a receiver 6 separated by an optical link 4. As is well known in the art, the link 4 may include multiple optical fiber spans separated by active optical devices such as, for example, optical amplifiers, channel equalizers etc. For simplicity of illustration, these elements are not shown in the drawings. Signal distortions due to non-linear effects, including Self Phase Modulation (SPM), cross-phase modulation (XPM), Modulation instability (MI) and four-wave mixing impressed on optical signals traversing the link 4 are represented (that is, approximated) by a link complex nonlinear operator T[E(t)]; where T[ ] is the operator, and E(t) is any optical signal. Known methods such as Voltarra Series can be used to represent the link operator T[E(t)]. See, for Example, Voltarra and Wiener, "theories of Non-Linear Systems", Martin & Schetzen, John Wiley & Sons., 1980. This link operator T[E(t)]t can be derived using known methods, such as, for example, as discussed in detail in Agrawal (supra). T[E(t)] can encompass one-to-one non-linear effects, in which an optical signal in one channel suffers distortions due to itself; many-to-one non-linear effects, in which an optical signal in one channel suffers distortions due to optical signals in two or more channels; and many-to-many non-linear effects, in which optical signals in many channels suffer distortions due to optical signals in many channels. For the sake of simplicity, the present invention is described by reference to embodiments that concentrate on compensation of one-to-one non-linear effects, it being understood that the same principles may be applied to many-to-one and many-to-many non-linear effects, without departing from the scope of the present invention. Linear Cross-talk is an artefact of the finite bandwidth of channel filters used to demultiplex closely spaced channels of a WDM signal arriving at the receiver 6 through the link 4. This finite bandwidth results in some optical signal power in one channel "leaking" through the filters of adjacent channels. Non-linear cross-talk occurs through mechanisms such as 4-wave mixing and XPM, as discussed in detail in Agrawal (supra).

In operation, a communication signal (or bit-stream) in the form of an electrical input signal x(t) 8 is converted into a corresponding optical signal $E_{IN}(t)$ 10 by a conventional Electrical-to-Optical (E/O) converter 12. The optical signal $E_{IN}(t)$ is then multiplexed into a WDM signal 14 by a conventional channel multiplexer 16. As the WDM signal 14 traverses the optical link 4, it is distorted by the complex nonlinear link operator T[ ], and arrives at the receiver 6 as a distorted WDM signal 14a. Within the receiver 6, a received optical channel signal $E_{OUT}(t)[=T[E_{IN}(t)]]$ 18 is demultiplexed from the distorted WDM signal 14a by a conventional demultiplexer 20 and converted into a corresponding electrical output signal y(t) 22 by a conventional Optical-to-Electrical (O/E) converter 24.

Various methods have been proposed for compensating non-linearities within an optical communications system. These systems typically operate by inserting one or more compensators within the link 4, represented in FIG. 1b by the compensation operator C[E(t)], where C[ ] is the operator and E(t) is any input optical signal. The compensation operator C[E(t)] is selected to optimize performance of the link 4.

Figure 1B:
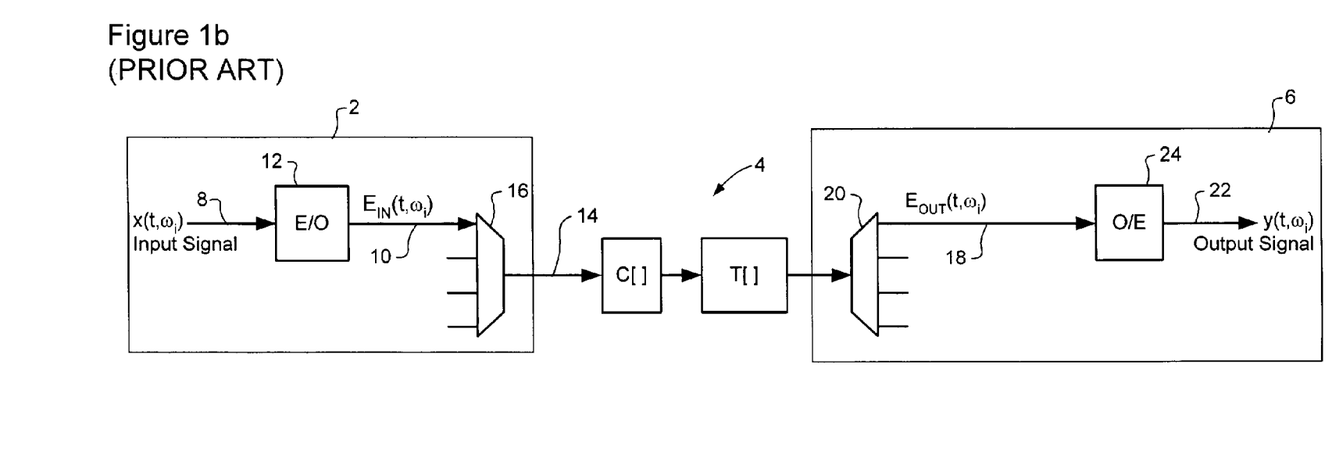

Ideally, the compensation operator C[E(t)] is equivalent to the inverse of the link operator T[E(t)], in which case T[C[E(t)]]=E(t), and the combined effect of T[ ] and C[ ] would be an undistorted received signal $E_{OUT}(t)$=T[C[$E_{IN}$(t)]] that exactly corresponds to the original optical signal $E_{IN}(t)$.

For example, co-assigned U.S. Pat. No. 6,124,960, entitled Transmission System with Cross-Phase Modulation Compensation, which issued on Sep. 26, 2000, describes a WDM transmission system carrying amplitude modulated traffic in which significant cross-phase modulation occurs. In this case, the compensation operator C[E(t)] is provided by "pre-chirping" each of the individual optical channels at the transmitter (that is, upstream of the channel MUX) with replicas, or low-pass filtered replicas of the amplitude modulation applied to each of the other channels. Pre-chirping of a channel in this manner imposes a chirp (or frequency shift) that is approximately equal and opposite to the XPM-induced chirp of the fiber link. Pre-chirping of each individual channel with a replica of the amplitude modulation applied to that same channel may also be used in order to provide compensation for self-phase modulation (SPM).

A limitation of this technique is that the pre-chirp is imposed as a discrete step prior to MUXing each channel into the optical fiber link 4. However, within the link 4, XPM (and SPM) induced chirp, and the associated time-domain signal distortions are distributed effects, in that they are a function of dispersion and link length. Consequently, while this technique facilitates compensation of XPM and SPM-induced frequency-domain signal distortions, it is not capable of fully compensating the associated time-domain distortions.

In co-assigned U.S. Pat. No. 6,067,180, entitled Equalization, Pulse Shaping and Regeneration of Optical Signals, which issued on May 23, 2000, the compensation operator C[E(t)] is provided by optical modulators that can be used at the receiver 6 to remove optical distortions (including SPM and XPM) from an inbound optical signal. A limitation of this approach is that the optical modulators tend to be complex, and thus expensive, and suffer high insertion losses. This latter issue reduces the desirability of these modulators in long-haul optical network links, in which the optical signal arriving at the receiver already have a low signal-to-noise ratio.

A technique for fully compensating effects of chromatic dispersion (including SPM) is described in "Exact Compensation for Both Chromatic Dispersion and Kerr Effect in a Transmission Fiber Using Optical Phase Conjugation" (Watanabe, S., et al., Journal of Lightwave Technology, Vol. 14, No. 3, March 1996, pp 243-248). In this technique, the optical fiber link is divided into two fiber sections separated by an Optical Phase Conjugator. The first section is designed as a highly dispersive medium, in which the dispersion is designed to mirror that of the second section. As a result, signal distortions impressed on an optical signal propagating through the first section will be offset by those of the second section. In effect, the compensation operator C[E(t)] is provided by the dispersion profile of the first section, and the optical phase conjugator. Theoretically, if the dispersion profile of the first section can be made to exactly mirror that of the second section, then the compensation operator C[E(t)] will be the inverse of the non-linear operator T[ ], and a substantially undistorted signal $E_{OUT}(t) \approx E_{IN}(t)$ will appear at the receiver-end of the optical fiber link.

This technique suffers numerous disadvantages. In particular, the first span must be designed so that the dispersion profile (along the length of the first section) closely mirrors the dispersion profile of the second section. This means that the first section must be uniquely designed for its corresponding second span, which dramatically increases costs. Furthermore, known optical phase conjugators are expensive, attenuate the optical signal, and introduce noise. Theoretically, the optical phase conjugator may be eliminated by designing the first section such that both the power and dispersion profiles of the first section mirror those of the second section. However, this solution is extremely difficult to implement in the optical domain, because mirroring of the power profile of the second section requires that the first section be provided with fiber spans with gain, and amplifiers with loss.

Accordingly, a cost-effective technique for mitigating the signal distortions due to non-linear effects in a WDM optical communications system remains highly desirable.

SUMMARY OF THE INVENTION

An object of the present invention is to provide a method and apparatus for at least partially compensating signal distortions due to non-linear effects in a WDM optical communications system.

Accordingly, an aspect of the present invention provides a method of compensating optical signal distortions due to nonlinear effects of an optical communications system. According to the present invention, a compensation operator is determined that substantially mitigates the nonlinearity-induced signal distortions imparted to a communications signal traversing the optical communications system. An electrical input signal is then input to the compensation operator to generate a predistorted electrical signal. This predistorted electrical signal is then used to modulate an optical source to generate a corresponding predistorted optical signal for transmission through the optical communications system.

In general, the compensation operator is the inverse of the optical link complex nonlinear operator T[ ]. Consequently, as the predistorted optical signal propagates through the optical link, the optical nonlinearities of the link operate on the predistorted optical signal such that the optical signal arriving at the receiving end of the link is substantially free of nonlinearity-induced distortions.

Thus the method of the invention implements compensation of optical nonlinearity-induced signal distortions at the transmitter end of the optical link, prior to Electrical-to-Optical (E/O) conversion of the input signal. This arrangement is particularly advantageous, because it enables compensation to be effectively implemented independently of the type of detection (i.e., direct or coherent) used in the receiver.

The present invention compensates nonlinearity-induced signal distortions by processing a communications signal in the electrical domain prior to transmission through an optical link of a communications system. This processing of the communications signal is governed in accordance with a compensation function that is the inverse of the optical link transfer function. With this arrangement, arbitrary nonlinearity-induced signal distortions imparted by the optical link can be compensated in such a manner that a comparatively undistorted optical signal is obtained at the receiving end of the optical link.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 2:
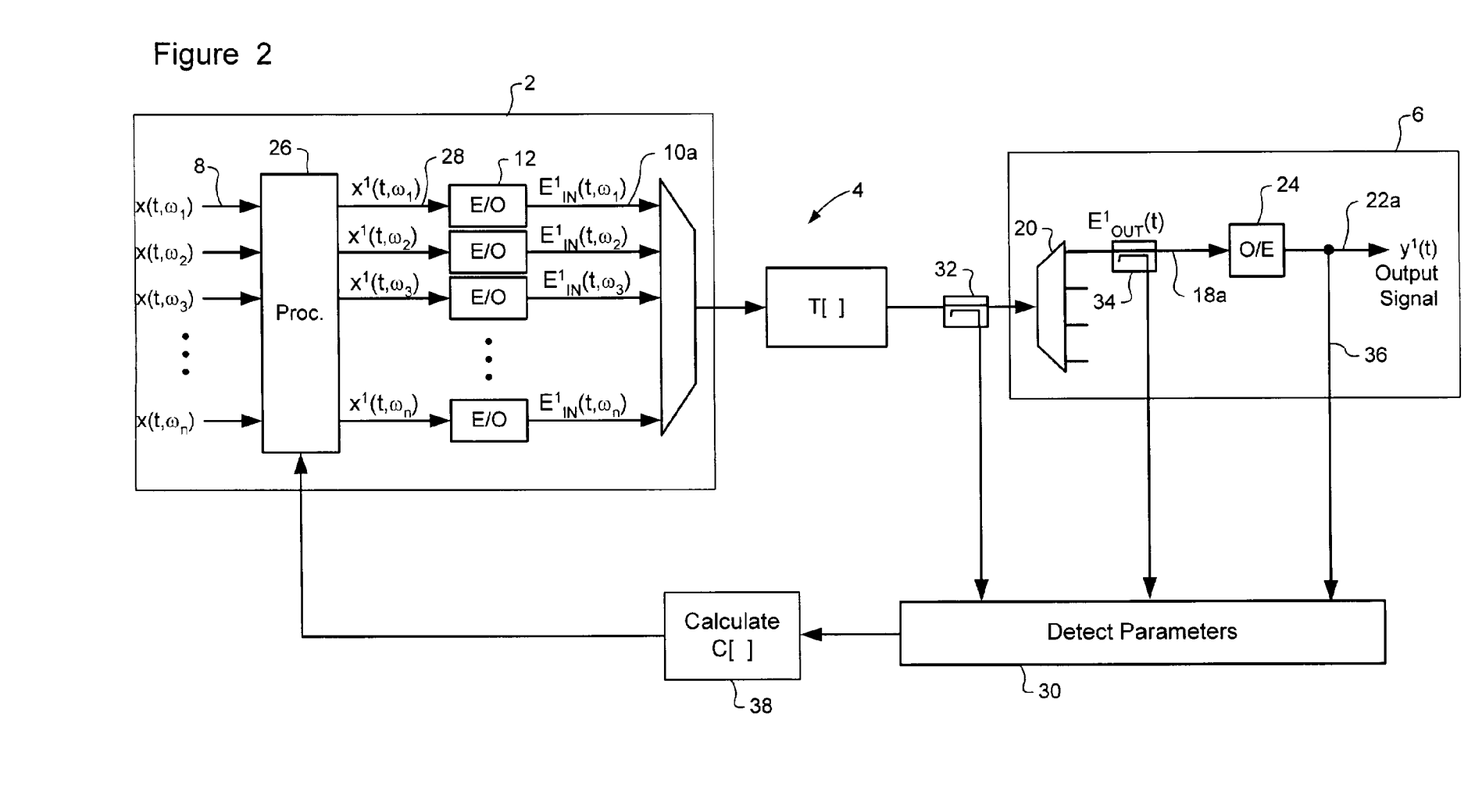
FIG. 2 is a block diagram schematically illustrating principal elements and operations of a compensation system in accordance with an embodiment of the present invention.

The present invention provides a method and system for compensation of non-linear and cross channel effects in an optical communications system. For the purposes of the present invention, "non-linear and cross-channel effects" shall be understood to refer to signal distortions due to phase non-linearities, such as Self Phase Modulation (SPM) cross-phase modulation (XPM), Modulation instability (MI) and four-wave mixing. "Cross-channel effects" shall be understood to refer to signal distortions due to optical cross-talk. FIG. 2 is a block diagram schematically illustrating principal elements and operations of a compensation system in accordance with the method of the present invention.

In accordance with the present invention, signal distortions due to the link complex non-linear operator T[E(t)] are at least partially compensated by deriving a compensation operator C[E(t)] that optimizes the performance of the link 4, and then predistorting the input signal x(t), in the electrical domain, using the determined compensation operator C[E(t)]. Because the link operator T[E(t)] is complex, the compensation operator C[E(t)] will also be complex.

In order to provide compensation for one-to-one, many-to-one, and many-to-many non-linear effects in a wavelength, division multiplexed (WDM) system, it is convenient to consider all of the channel signals together using vector notation. Thus all of the channel input signals can be referenced collectively as an input vector:

$$X(t)=[x(t,\omega_1), x(t,\omega_2), x(t,\omega_2), \ldots x(t,\omega_n)]$$

where $x(t,\omega_i)$ is the input signal for the ith WDM channel. Similar notation can be used across the entire link 4. Thus, for example, the WDM signal can be represented as a vector:

$$E(t)=[E(t,\omega_1), E(t,\omega_2), E(t,\omega_2), \ldots E(t,\omega_n)]$$

where $E(t,\omega_i)$ is the optical channel signal for the ith WDM channel. Following this notation for referencing all of the channels together, the link complex non-linear operator T[E(t)] and the compensation operator C[E(t)] will both be matrix operators. Many-to-one and many-to-many effects can then be readily approximated by computing appropriate values for each element of the link complex non-linear operator T[E(t)], and the compensation operator C[E(t)] can, for example, be derived by calculating the inverse of the link complex non-linear operator T[E(t)]. In order to simplify the description of the present invention, the following description will focus on a single channel. In this case, vector and matrix notation can be avoided, and the channel identifier ($\omega_i$) omitted, for the sake of brevity. Those of ordinary skill in the art will appreciate that this description applies directly to the case of one-to-one non-linear effects (e.g. self-phase modulation), and can be readily extended to cover many-to-one and many-to-many non-linear effects by reverting to vector and matrix notation and methods to treat all of the channels together.

As shown in FIG. 2, a compensation processor 26 uses the compensation operator C[E(t)] to process each channel input signal x(t) 8, thereby producing a corresponding predistorted electrical input signal $x^1(t)$ 28. The predistorted input signal $x^1(t)$ 28 is then converted into a corresponding predistorted optical signal $E^1_{IN}(t)$ 10a by the E/O converter 12, multiplexed into a WDM signal 14 and transmitted through the optical link 4 to the receiver 6. Mathematically, the predistorted optical signal $E^1_{IN}(t)$ 10a can be related to the (undistorted) channel optical signal $E_{IN}(t)$ 10 generated by the E/O converter 12 in the conventional system of FIG. 1 as $E^1_{IN}(t)=C[E_{IN}(t)]$.

Within the receiver 6, a conventional demultiplexer 20 DEMUXs the incoming optical signal $E^1_{OUT}(t)$ 18a from the WDM signal 14 traversing the link 4. The Optical-to-electrical (O/E) converter 24 then converts the optical signal $E^1_{OUT}(t)$ 18a into a corresponding output signal $y^1(t)$ 22a. As may be seen in FIG. 2, the received optical signal $E^1_{OUT}(t)$ 18a is the predistorted optical signal $E^1_{IN}(t,\omega_i)$ 10a modified by the link non-linear operator T[E(t)], thus:

$$E_{OUT}^1(t)=T[E_{IN}^1(t)]=T[C[E_{IN}(t)]] \quad (Eq.1)$$

As may be appreciated, when the distortions introduced by the compensation operator C[E(t)] exactly counterbalance those introduced by the link non-linear operator T[E(t)], the received optical signal $E^1_{OUT}(t)$ 18a "seen" by the O/E converter 24 will be substantially identical to the original (undistorted) optical signal $E_{IN}(t)$ 10 (FIGS. 1a and 1b).

If desired, the link non-linear operator T[E(t)] may include non-linear effects of the multiplexer 16 and demultiplexers 20 (such as cross-talk), as well as non-linearities of the E/O and O/E converters 12 and 24. In this case the compensation operator C[E(t)] will also provide effective compensation of these effects as well.

Thus the present invention provides a technique for compensating distortions impressed upon an optical signal traversing the link 4, by predistorting the original input signal x(t) 8, in the electrical domain, prior to E/O conversion and transmission through the optical link 4. Because distortion compensation is accomplished in the electrical domain, a substantially arbitrary compensation operator C[E(t)] can be implemented, thereby facilitating effective compensation of even comparatively severe non-linear and cross-channel effects.

As may be appreciated, the compensation operator C[E(t)] can be formulated in various ways. Typically, the compensation operator C[E(t)] will be formulated as the inverse of the link operator T[E(t)], such that T[C[E(t)]]≈E(t). In this case, the compensation operator C[E(t)] will contain the same terms as the link operator T[E(t)], and "determination" of the compensation operator C[E(t)] in order to facilitate electrical domain predistortion of the input signal x(t) 8, becomes a matter of determining magnitudes of each term of C[E(t)].

It may be noted that extreme non-linear and cross-channel effects can be imagined for which a practical solution for the compensation operator C[E(t)] will not be possible. Furthermore, it should be appreciated that the extent or degree of compensation will be inherently limited by the formulation of the compensation operator C[E(t)] implemented in the compensation processor 26. For example, consider a case in which the compensation operator C[E(t)] is formulated to only compensate SPM. While parameters of this compensation operator C[E(t)] can be determined such that SPM is exactly compensated, signal distortions due to other effects of the link (such as XPM, MI, four-wave mixing and cross-talk) will remain uncompensated. Accordingly, for the purposes of the present disclosure, references to "compensation of non-linear and cross-channel effects" should be understood to refer to those effects that are accounted for by the chosen formulation of the compensation operator C[E(t)]. Similarly, references to a "substantially undistorted optical signal" being obtained at a receiving end of the link 4, as a result of non-linear and cross-channel effects of the link 4 operating on the predistorted optical signal $E^1{}_{IN}(t)$ 10a, should be understood to mean that the received optical signal $E^1{}_{OUT}(t)$ 18a is substantially free of signal distortions due to those effects that are compensated by the specific formulation of the compensation operator C[E(t)] being used in that embodiment.

Various methods may be used to determine the compensation operator C[E(t)]. In the example of FIG. 2, the WDM signal 14 and optical signal $E^1{}_{OUT}(t)$ 18a at or near the receiver 6 is monitored (at 30) in order to detect signal quality parameters indicative of non-linear and cross-channel effects of the optical link 4. In preferred embodiments, the signal quality parameters comprise direct measurements of SPM, XPM, MI, four-wave mixing and cross-talk across the wavelength band of interest. Methods of measuring SPM, XPM, MI, four-wave mixing and cross-talk are known in the art. Methods for measuring these parameters in installed networks are disclosed in, for example, U.S. Pat. No. 6,128,111 (Roberts et al.), and co-assigned and co-pending U.S. patent application Ser. No. 10/389,804, entitled Monitoring Phase Non-Linearities In An Optical Communications System. Thus, for example, XPM between a pair of channels can be measured by launching a probe signal through a first channel, while a data signal $E_D(t)$ is simultaneously transmitted through the other channel. As the two signals co-propagate through the link 4, XPM between channels A and N generates a test signal which is received, by the receiving node 4b, through channel N. Correlation between the received probe and test signals enables computation of an XPM transfer function, which models XPM-induced signal distortions impressed on signal traffic traversing the link.

In many cases, SPM can be described as a function of XPM, because the mechanisms involved in producing both XPM and SPM are related. Consequently, for any particular optical communications system, a look-up table can be defined for estimating SPM from the detected XPM. The data used to populate the look-up table may, for example, be based on experimental data obtained during the set-up and commissioning of the optical communications system. If desired, the look-up table data may be updated, e.g., using fresh experimental data obtained during maintenance of the optical communications system to accommodate migration of the optical component performance.

Alternatively, a data signal arriving at the receiving node can be monitored to detect variations in signal noise with dispersion. This provides a direct indication of total XPM- and SPM-induced signal distortions, but does not enable these effects to be separated.

Some optical networking equipment utilize high-speed Analog-to-Digital Converters (ADCs) to convert received data traffic into corresponding digital signals for data recovery and system management. The sample rate of these ADCs can be chosen to satisfy Nyquist's theorem for the received signal traffic, which means that the complete received signal waveform can be recovered from the digital data stream produced by the ADC. Conventional data recovery circuits, such as digital equalizers and Forward Error Correction circuits can then be used to recover data bits from the digital data stream. With this arrangement, it is possible to store sample data in the form of a sequential series of digital samples of the digital data stream produced by the ADC. This sample data can be correlated with the corresponding data bits recovered by the receiver's data recovery circuits. Comparison between the signal waveform (as represented by the stored ADC output) and the corresponding recovered data bits provides a direct measure of signal distortions, and can be used to directly compute the complex transfer function due to dispersion and SPM. Comparison between the signal waveforms (as represented by the respective stored ADC outputs) of adjacent channels provides a direct indication of cross-channel effects, such as crosstalk.

The above-noted methods can be used, either alone or in combination, to evaluate phase non-linearities and cross-channel effects within the link 4. This information can then be used to determine the compensation operator C[E(t)], using known methods.

Other signal quality parameters such as, for example, the bit error rate, signal-to-noise S/N ratio, variance of the signal dispersion or eye closure may be used as proxies for the non-linear and cross-channel effects. Any of the signal quality parameters may be detected based on an optical signal obtained by tapping the WDM signal 14 within optical link 4 (as shown at 32), the demultiplexed optical channel signal $E^1{}_{OUT}(t)$ (at 34), and/or by analysis of the output signal y1(t) 22a generated by the E/O converter 24 (as shown at 36). A compensation operator C[E(t)] which optimizes the detected parameters can then be determined (at 38) deterministically and/or adaptively, using known techniques.

Other methods may be used to determine the compensation operator C[E(t)]. For example, U.S. Pat. No. 6,124,960 (Garth et al) teaches a method of computing the transfer function due to XPM between any pair of wavelengths in a WDM system. This XPM transfer function can be used to determine appropriate component values of the compensation operator C[E(t)] to compensate XPM.

Alternatively, the compensation operator C[E(t)] could be computed by simulating the optical performance of a hypothetical mirror image of the optical link 4, using known methods of computing optical fiber nonlinear propagation, such as split-step Fourier. In this case, the link 4 is described by $\gamma(z)=\bar{\gamma}P(z)$, where $\bar{\gamma}$ is the coefficient of non-linearity and P(z) is the power profile along the link. Define z=L/2 as the beginning of the link 4 and z=L as the end of the link. A hypothetical mirror image of the link 4 is then defined for $0 \leq z \leq L/2$ and has the property that $\gamma(z)=\gamma(L-z)$. The predistorted signal $x^1(t)$ is then calculated using mid-span spectral inversion, that is, by propagating the input signal x(t) from z=0 to z=L/2 using the pulse propagation equation, and then phase conjugating the result. The parameters needed for this computation are the fiber losses, fiber types, signal power levels, EDFA or Raman amplification, and dispersion for each fiber span and amplifier of the link 4. These values could be measured before (or during) system installation, or may be measured by the system using, for example, the methods of U.S. Pat. No. 5,513, 029 to measure power levels; U.S. Pat. No. 6,252,692 to measure dispersion, U.S. patent application Ser. No. 09/481, 691 to determine the fiber type, U.S. patent application Ser.

No. 09/852,777 to measure distributed Raman amplification, and U.S. patent application Ser. No. 09/975,985 to measure the PDL.

It should be noted that the functional step of determining the compensation operator C[E(t)] (at 38) can be implemented by any suitable combination of hardware and software, which may be co-located with the receiver 6, the transmitter 2, or any other location. In embodiments in which the detected parameters comprise direct measurement of non-linearities, or calculation of an associated transfer function, the compensation operator C[E(t)] can be calculated to minimize (and preferably eliminate) the total non-linearity-induced signal distortion. Where bit error rate and/or eye closure are used as proxies, then the compensation operator C[E(t)] would be calculated to optimize these respective values.

Figure 3:
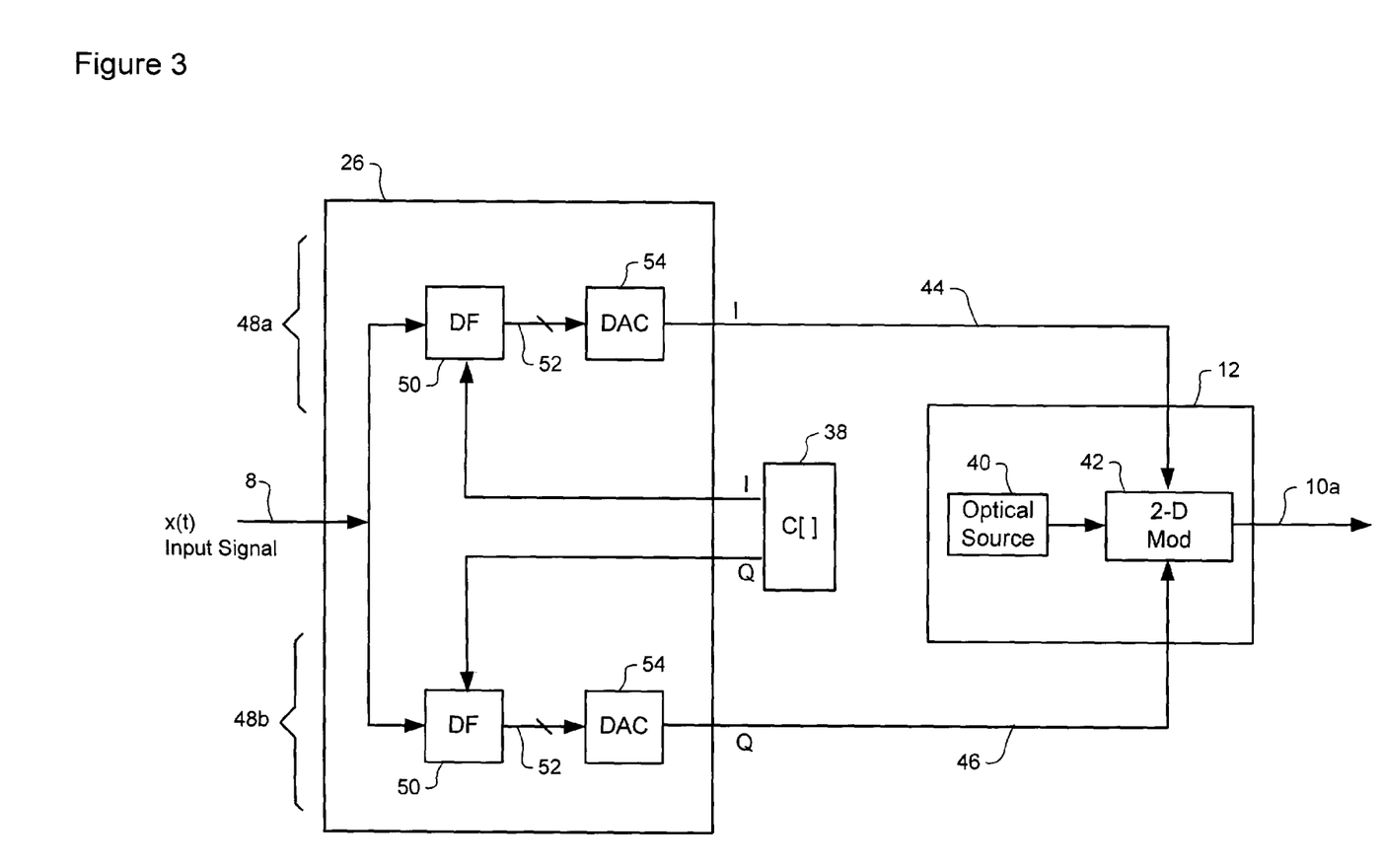
FIG. 3 is a block diagram schematically illustrating principal elements and operations of a first compensation processor usable in the embodiment of FIG. 2.

As mentioned above, because the link operator T[E(t)] is complex, the compensation operator will also be complex. In this case, the E/O converter 12 must be designed in such a manner that differential phase delays can be impressed onto an outgoing optical signal, in addition to amplitude information of the input signal x(t) 8. Various known E/O converters are capable of providing this functionality. In the embodiment of FIG. 3, the E/O converter 12 is provided as a tuned optical source 40 such as a narrow band laser coupled to a 2-Dimensional optical modulator 42. With this arrangement, the 2-D modulator 42 can be driven to modulate the amplitude and phase delay of the optical source 40 output to generate the predistorted optical signal $E^1_{IN}(t)$ 10a. Various known 2-D optical modulators capable of providing this functionality are known in the art, such as, for example, Mach-Zehnder modulators.

In general, the design of the compensation processor 26 will be driven by the formulation of the compensation operator C[E(t)] and the requirement that the predistorted signal $x^1(t)$ 28 must be formatted to provide suitable control signals for the E/O converter 12. In the embodiment of FIG. 3 the 2-D modulator 42 is controlled by a respective pair of orthogonal ( )e.g. In-phase and Quadrature) signal components I and Q (at 44 and 46) of the predistorted signal $x^1(t)$ 28. Consequently, the compensation processor 26 provides a pair of compensation paths 48 which are designed to generate the required in-phase and quadrature signal components I and Q of the predistorted signal $x^1(t)$ 28. Each compensation path 48 includes a respective (generally non-linear) digital filter 50 which receives the input signal x(t) 8, and accepts a respective component of the compensation operator C[E(t)] as an input. The output of each digital filter 50 is a stream of successive digital values 52 of the respective signal components, which can then be converted into corresponding instantaneous levels of the analog predistorted signal $x^1(t)$ 28 component using a respective digital-to-analog converter 54.

As may be appreciated, the compensation processor 26 can be implemented to generate signal components of the predistorted signal $x^1(t)$ 28 in any desired format, such as, for example, polar coordinates. The only limitation here is that a suitable 2-D modulator 42 must be provided for modulating the appropriate optical components in response to the signals generated by the compensation processor 26.

Figure 4:
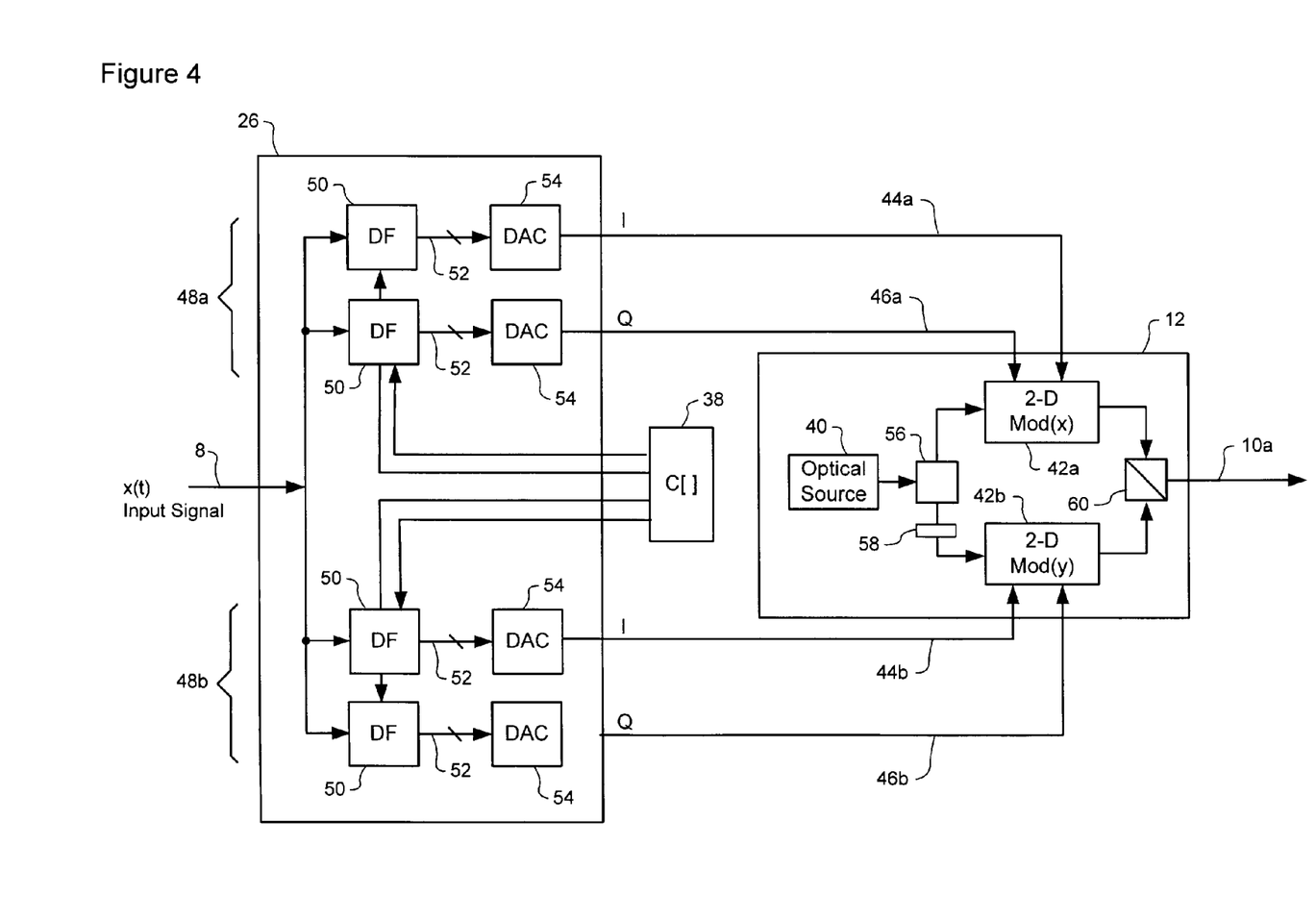
FIG. 4 is a block diagram schematically illustrating principal elements and operations of a second compensation processor usable in the embodiment of FIG. 2.

FIG. 4 is a block diagram illustrating an embodiment in which the E/O converter 12 is designed to launch the predistorted optical signal $E^1_{IN}(t)$ 10a with an arbitrary polarisation. In this case, the E/O converter 12 is provided as a tuned optical source 40 such as a narrow band laser coupled to a pair of conventional 2-dimentional optical modulators 42. A conventional optical power divider 56 operates to divide the light from the source 40 into a pair of $HE_{11}$ modes, each of which is modulated by a respective one of the 2-D modulators 42. One of the $HE_{11}$ modes is subjected to a polarization rotation of 90°, for example using a conventional quarter-wave birefringent plate 58. The modulated $HE_{11}$ modes are then combined by a conventional polarization combiner 60 and launched into the optical link 4. With this arrangement, each 2-D modulator 42 can be independently driven to modulate the amplitude and phase delay of its respective optical mode. As in the embodiment of FIG. 3, various known 2-D optical modulators capable of providing this functionality are known in the art, such as, for example, Mach-Zehnder modulators.

Using the above arrangement, the compensation processor 26 of FIG. 4 provides an independent compensation path 48 for each $HE_{11}$ mode. Each compensation path 48 provides a parallel set of digital filters 50 and DACs 54 for generating respective orthogonal (I and Q) components 44 and 46 of the respective mode of the predistorted signal $x^1(t)$ 28.

Various known digital filter types may be used to implement each digital filter 50, such as a direct form implementation and a Random Access Memory Look-up Table (RAM LUT). In either case, the, digital filter 50 and DAC 54 in each compensation path 48 cooperate to generate the predistorted signal $x^1(t)$ 28, which compensates signal distortions due to the link nonlinear operator T[E(t)].

Figure 5A:
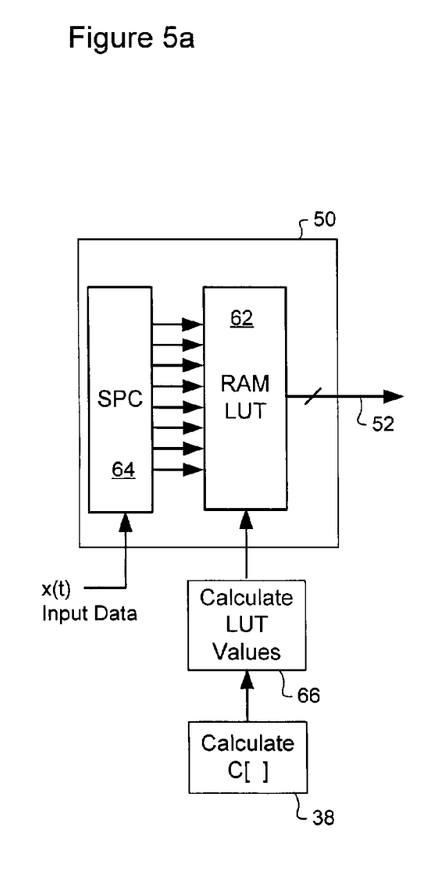
FIGS. 5a-5c are block diagrams schematically illustrating respective alternative embodiments of the digital filter of FIGS. 3 and 4.

FIG. 5a schematically illustrates an embodiment in which the digital filter 50 is implemented using a RAM LUT 62. This technique exploits the fact that the input signal x(t) 8 is a substantially undistorted binary signal, in which successive bits can be unambiguously discriminated. This greatly simplifies the problem of digitally filtering the input signal x(t) 8.

As shown in FIG. 5a, successive bits of the input signal x(t) 8 are latched through a serial-to-parallel converter (SPC) 64 (e.g., a shift register) which converts the serial bit stream into a parallel bit stream having a width of N bits. In the embodiment illustrated in FIG. 5a, N=8, it being understood that other values of N may be used as desired. The parallel data stream is then used to access random access memory (RAM) look-up table 62 having $2^N$ registers (not shown).

Each register of the look-up table 62 contains at least one digital value representing a corresponding instantaneous analog level of the respective component (44, 46) of the predistorted signal $x^1(t)$ 28, which has been previously calculated for a unique set of N bits. Accordingly, as the (serial) input signal x(t) 8 is latched through the serial-to-parallel converter 64, a stream of successive digital values 52 of the predistorted signal 28 are output from the look-up table 62. This stream of digital values 52 can then be converted into the corresponding analog signal component 44,46 using the digital-to-analog converter 54. The analog predistorted signal $x^1(t)$ 28 can then be converted into the corresponding predistorted optical signal $E^1_{IN}(t)$ 10a by optical converter 12, as described above.

Because phase nonlinearities cause time domain distortions of the optical input signal $E_{IN}(t)$, the instantaneous level of the analog predistorted input signal $x^1(t)$ 28 at a particular instant (t) will necessarily be a function of the analog waveform of the input signal x(t) within a time window that brackets the instant in question. The width of the time window, measured in symbols, will generally be a function of the maximum dispersion for which compensation is to be provided; the bandwidth of the optical signal; and the symbol interval of the optical signal.

Following the discussion above, it will be seen that each value stored in the look-up table 62 can readily be calculated (at 66) by applying the calculated compensation operator C[E(t)] to each one of the $2^N$ possible N-bit sequences. For each N-bit sequence, the calculated look-up table value would then be stored in the RAM look-up table 62 register that is indexed by the N-bit sequence in question. This process will result in the look-up table 62 being loaded with pre-calculated values of the predistorted signal 28 which will be accessed, in sequence, as successive bits of the input data signal x(t) are latched through the serial-to-parallel converter 64.

In order to enable accurate generation of the analog signal component 44,46 by the DAC 54, the rate at which digital values 52 are output from the RAM LUT 62 should preferably satisfy Nyquist's Theorem for the input signal x(t) 8, including the effects of spectral regrowth. This will normally require that the RAM LUT 62 output more than one digital value 52 of the predistorted signal 28 component for each symbol of the input signal x(t). Thus, for example, digital values 52 can be latched out of the RAM LUT 62 at a clock speed that is two or more times the data-rate of the input signal x(t) 8. This can readily be accomplished by calculating (at 66) the required set of digital values for each N-bit sequence, and storing the resulting set of digital values in the appropriate register. Consequently, as each bit of the input signal x(t) is latched through the SPC 64, all of the digital values calculated for each unique N-bit sequence will be output, in the appropriate sequence, from the RAM LUT 62.

Figure 5B:
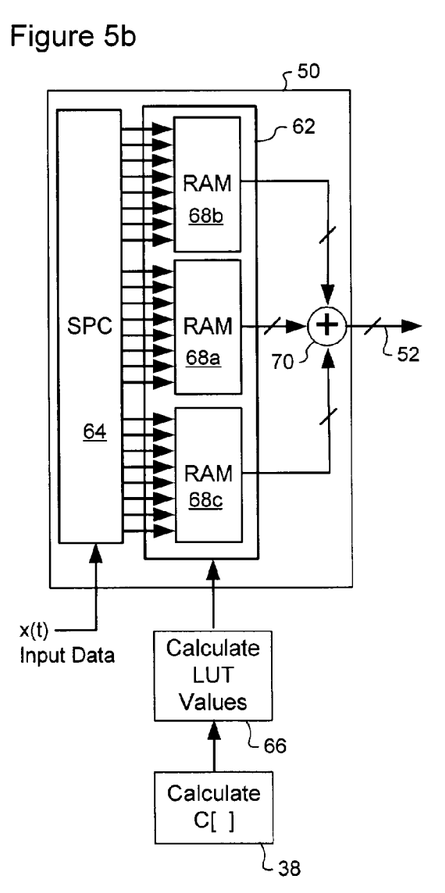

As mentioned above, in the embodiment of FIG. 5a, N=8, meaning that the system can compensate time domain distortions spanning at most 8 symbols. For long-haul optical links, distortion compensation spanning a far greater number of symbols (e.g., up to 76, or more) may be required. In principle, the RAM LUT 62 and SPC 64 can be expanded as required to span any desired number of symbols. However, as N increases, the size of the RAM LUT grows exponentially (since a RAM contains $2^N$ registers) with the result that manufacturing costs of the RAM LUT 62 begin to impose serious penalties. These limitations can be avoided by using a linearizing approximation and dividing the RAM LUT 62 into a series of two or more smaller RAMs 68, as shown in FIG. 5b. In this case, each RAM 68 stores a respective portion of the desired numerical value(s) 52 of the predistorted signal component $x^1$(t) 28. The outputs from each RAM 68 are digitally summed (at 70), in a conventional manner, to produce a numerical value 52 that is an acceptable approximation of the "ideal" value generated by the singular RAM LUT 62 of FIG. 5a. This arrangement enables the digital filter 50 to provide effective distortion compensation spanning virtually any desired number of symbols, simply by providing a suitable number of RAMs 68.

For many practical optical link topologies, signal variations due to non-linear effects are concentrated within the center portion of the compensation window. Toward the extreme ends of the compensation window, signal walk-off tends to randomize variations due to non-linear effects, such that these variations tend to become indistinguishable from linear noise. This provides an opportunity for reducing the size and complexity of the RAM LUT 50.

Figure 5C:
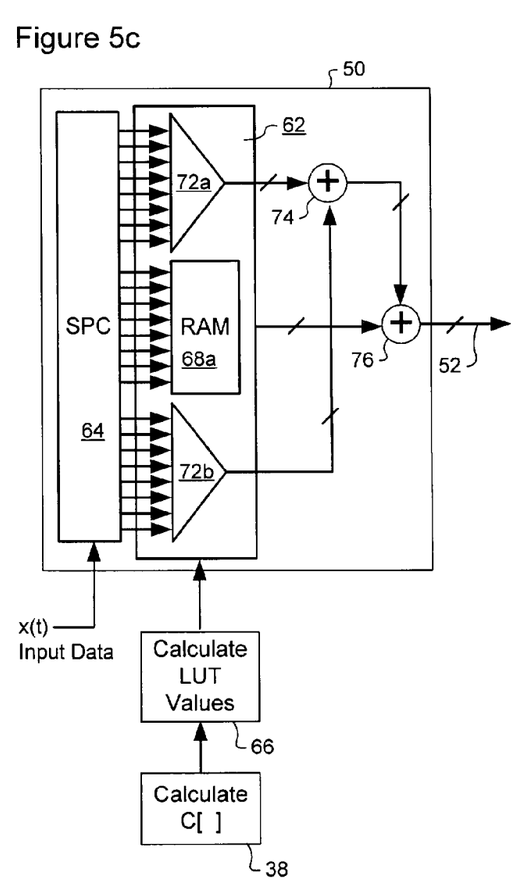

Accordingly, the embodiment of FIG. 5b may be modified by replacing the RAMs 68b and 68c at the extreme ends of the SPC 64 (e.g., receiving the first and last 32 bits) with linear addition trees 72, as shown in FIG. 5c. The RAM 68a lying at the center of the SPC 64 (e.g., to receive the middle 12 bits) is retained, and therefore enables accurate compensation of non-linear effects in the center portion of the compensation window. Preferably, the size of the central RAM 68a is maximized. The respective outputs of the linear addition trees 72 are digitally summed (at 74), and then digitally added to the output of the center RAM 68a (at 76) to yield a numerical value 52 that is an acceptable approximation of the "ideal" level of the predistorted signal 28.

Figure 6:
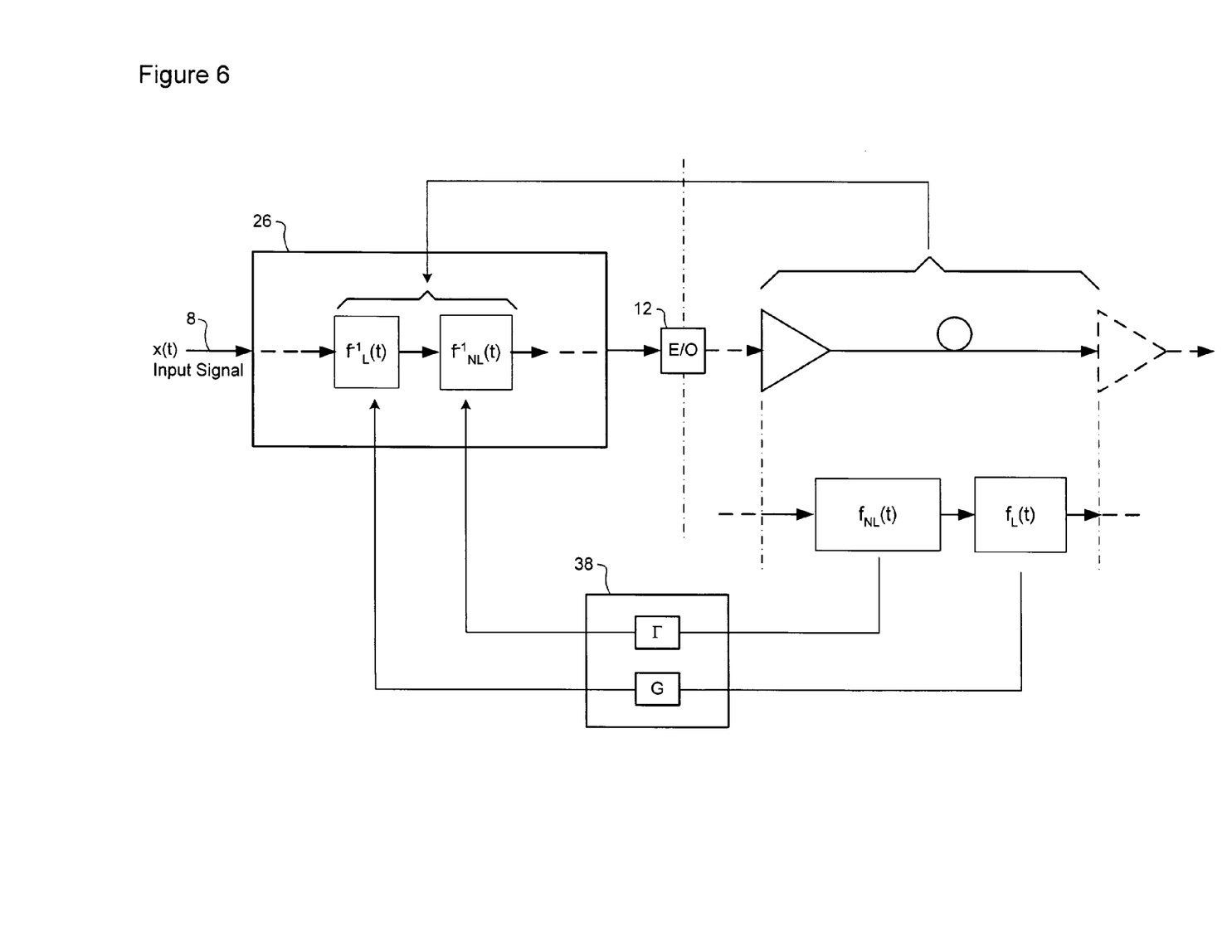
FIG. 6 is a block diagram schematically illustrating principal elements and operations of a third compensation processor usable in the embodiment of FIG. 2.

FIG. 6 illustrates principal elements of an alternative embodiment of the compensation processor 26. This embodiment relies on the fact that the optical performance of a span of the optical link 4, can be mathematically approximated using cascaded functions that collectively define a respective span operator, $T_i[\ ]$. Using this approximation, phase non-linearities of an individual span (i) can be modeled using an operator $T_i[\ ]$ in the form of non-linear function cascaded with a linear filter function. A typical non-linear filter function usable for this purpose is:

$$f_{NL}(t) = \exp[-j\Gamma L_{\mathit{eff}}|E^2(t)|]$$

where $\Gamma$ is a constant; and $L_{\mathit{eff}}$ is the effective length of the non-linearity in the fiber. A simple linear filter function that may be used is the loss and dispersion of the span. A simple linear filter function that may be used is:

$$f_L(t) = G \cdot TF(t)$$

where G is the gain/loss of the span, and TF(t) is a linear transversal filter which approximates the dispersion of the span. As will be appreciated, various other known linear and non-linear functions may be used to approximate the performance of the span, in a manner well known in the art.

Using the above mathematical approximations for each span of the link 4, the compensation processor 26 can be constructed by cascading linear and non-linear filters to mathematically mirror the cascaded non-linear and linear functions of the link 4. Thus each span of the link 4 is represented by a corresponding linear/non-linear filter pair, which implements the corresponding span compensation operator $C_i[\ ]$. The linear and non-linear filters are arranged in reverse order, relative to the functions used to approximate the span, and each filter implements the inverse of its corresponding function, as may be seen in FIG. 6. In this case, $L_{\mathit{eff}}$ of each span is known in advance, so that, for a span operator $T_i[\ ]$ formed by the non-linear and linear functions described above, derivation of the corresponding span compensation operator $C_i[\ ]$ comprises calculation of the constants $\Gamma L_{\mathit{eff}}$, G, and TF(t) for the span.

Figure 7:
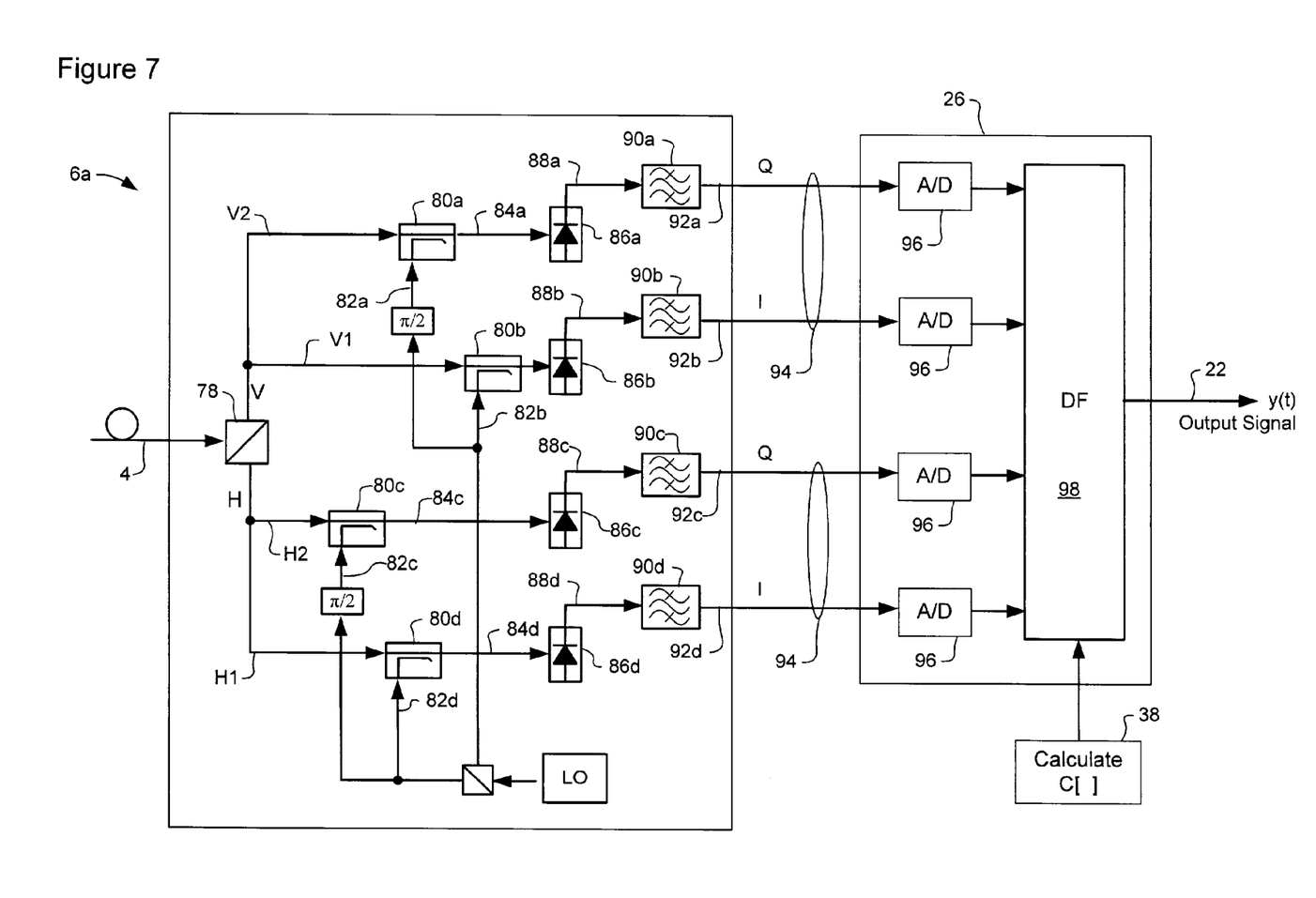
FIG. 7 is a block diagram schematically illustrating principle elements and operations of a compensation system in accordance with an alternative embodiment of the present invention.

In the embodiments described above with reference to FIGS. 1-6, the compensation processor 26 is located in the transmitter 2, and implements compensation of phase non-linearities by predistorting the input signal x(t) in the electrical domain, prior to E/O conversion and transmission through the link. As may be appreciated, directly analogous techniques may be used to implement electrical domain compensation in the receiver 6. FIG. 7 is a block diagram schematically illustrating a receiver including a compensation processor in accordance with the present invention.

The receiver of FIG. 7 utilizes a four-dimensional coherent receiver capable of detecting and receiving an incoming optical signal with an arbitrary polarization. Thus, a polarization beam splitter 78 separates the inbound optical signal $E_{OUT}(t)$ into orthogonal polarization modes (denoted as H and V), each of which is sub-divided into a respective pair of components (denoted as H1, H2, V2 and V2). If desired, however, a polarization controller (not shown) can be used upstream of the polarization beam splitter 78, in order to align the polarization of the inbound optical signal $E_{OUT}(t)$ to a principal axis of the polarization beam splitter 78. Respective optical couplers 80 then mix the optical components H1,H2,V1,V2 with a respective local oscillator signal 82, and the combined lightwave 84 detected by a conventional photodetector 86. The resultant Intermediate Frequency (IF) signal 88 is then filtered by a conventional band-pass filter 90, to generate a corresponding received signal component 92.

As may be seen in FIG. 7, the receiver 6a generates a received signal $E_{OUT}(t)$ in the form of a respective pair 94 of received signal components 92 for each polarization mode H,V. Each signal pair 94 provides orthogonal (e.g., quadrature) components of the respective polarization mode H and V, and therefore provides sufficient information for the reconstruction of the respective polarization mode H and V of the received signal $E_{OUT}(t)$. Taken together, the two received signal pairs 94 contain sufficient information for complete reconstruction of the received signal $E_{OUT}(t)$ including amplitude, phase, and polarization dependent content.

The compensation processor 26 comprises a respective Analog-to Digital A/D converter 96 for sampling each signal component 92 at the Nyquist frequency (including spectral regrowth) A digital filter 98 then processes the digital signal components to generate the (substantially undistorted) output signal y(t) 22. Either of the methods described above with reference to FIGS. 4 and 6 may be used to implement the digital filter 98. For the method of FIG. 6, the linear and non-linear filter blocks need to be suitably reordered, in order to properly mirror the span 4. It is theoretically possible to design the digital filter 98 to implement the non-linear Schrodinger equation and performing a (hypothetical) mid-span spectral inversion. By recalculating the Schrodinger equation for each successive bit of the output signal y(t) 22, signal distortions due to phase non-linearities can be compensated.

The embodiment(s) of the invention described above is(are) intended to be exemplary only. The scope of the invention is therefore intended to be limited solely by the scope of the appended claims.

We claim:

1. A method of compensating optical signal distortions due to nonlinear and cross channel effects of an optical communications system, the method comprising steps of:
   determining a compensation operator C[(E(t)] that is the inverse of a link complex non-linear operator T[E(t)] representing one or more signal distortions due to non-linear and cross channel effects imparted to a Wavelength Division Multiplexed communications signal E(t) as it traverses the optical communications system;
   digitally processing an electrical input signal X(t) comprising at least two parallel channel input signals $x(t,\omega_i)$ using the compensation operator C[(E(t)] to generate a predistorted electrical signal $X^1(t)$ comprising a respective predistorted channel input signal $x^1(t,\omega_i)$ corresponding to each channel input signal $x(t,\omega i)$; and
   modulating an optical source using the predistorted channel input signals $x1(t,\omega_i)$ to generate corresponding predistorted optical channel signals $E(t,\omega i)$ for transmission through the optical communications system;
   wherein the step of digitally processing the electrical input signal X(t) comprises steps of:
      calculating successive numerical values of the predistorted electrical signal, $X^1(t)$, based on the electrical input signal X(t) and the compensation operator C[E(t)]; and
      converting each successive numerical value into corresponding analog values of each predistorted channel input signal $x^1(t,\omega_i)$ of the predistorted electrical signal $X^1(t)$;
   wherein each channel input signal $x(t,\omega_i)$ of the electrical input signal X(t) comprises a substantially undistorted binary signal, and wherein the step of calculating successive numerical values of the predistorted electrical signal $X^1(t)$ comprises steps of:
      calculating a respective numerical value of the predistorted electrical signal $X^1(t)$ corresponding to each one of a set of predetermined N-bit sequences;
      storing each calculated numerical value in a look-up table; and
      extracting a plurality of successive numerical values of the predistorted electrical signal $X^1(t)$ from the look-up table using the electrical input signal X(t).

2. A method as claimed in claim 1, wherein the step of determining a compensation operator comprises steps of:
   measuring a performance parameter related to the signal distortions due to nonlinear and cross channel effects; and
   calculating respective values of one or more parameters of the compensation operator that optimizes the measured performance parameter.

3. A method as claimed in claim 2, wherein the step of measuring the performance parameter comprises a step of measuring any one or more of:
   cross-phase modulation;
   self phase modulation;
   modulation instability; and
   cross-talk.

4. A method as claimed in claim 1, wherein each predistorted channel input signal $x^1(t,\omega_i)$ of the predistorted electrical signal $E^1(t)$ is represented by a pair of orthogonal components, and the step of calculating successive numerical values of the predistorted electrical signal $E^1(t)$ comprises a step of calculating successive corresponding values of each component.

5. A method as claimed in claim 1, wherein the set of predetermined N-bit sequences encompasses all possible sequences of N-bits.

6. A method as claimed in claim 1, wherein the step of extracting a plurality of successive numerical values of the predistorted electrical signal $X^1(t)$ comprises steps of:
   converting the electrical input signal X(t) into a series of N-bit words;
   using each N-bit word as an index value to access a respective register of the look-up table.

7. A method as claimed in claim 6, wherein the step of extracting a plurality of successive numerical values of the predistorted electrical signal $X^1(t)$ comprises a step of extracting at least one numerical value of each predistorted channel input signal $x^1(t,\omega_i)$ of the predistorted electrical signal $X^1(t)$ for each N-bit word.

8. A method as claimed in claim 1, wherein the number (N) of bits within each sequence is based on any one or more of:
   an expected maximum dispersion of the optical communications system; and
   an expected response time of the look-up table.

9. A method as claimed in claim 1, wherein the steps of calculating respective numerical values of the predistorted electrical signal $X^1(t)$ and storing the calculated numerical values in a look-up table are repeated at predetermined intervals.

10. A compensation system for compensating optical signal distortions due to nonlinear and cross channel effects of an optical communications system, the compensation system comprising:
    a processor for determining a compensation operator C[E(t)] that is the inverse of a link complex non-linear operator T[E(t)] representing one or more signal distortions due to non-linear and cross channel effects imparted to a Wavelength Division Multiplexed communications signal E(t) as it traverses the optical communications system;

a compensation processor for digitally processing an electrical input signal X(t) comprising at least two parallel channel input signals $x(t,\omega_i)$ using the compensation operator C[(E(t)] to generate a predistorted electrical signal $X^1(t)$ comprising a respective predistorted channel input signal $x^1(t,\omega_i)$ corresponding to each channel input signal $x(t,\omega_i)$; and an optical modulator for modulating an optical source using the predistorted channel input signals $x^1(t,\omega_i)$ to generate a corresponding predistorted optical channel signals $E(t,\omega_i)$ for transmission through the optical communications system;

wherein the compensation processor comprises:

a digital filter for filtering the electrical input signal X(t) using the compensation operator C[E(t)] to generate a series of successive numerical values of the predistorted electrical signal $X^1(t)$; and a digital-to-analog converter for converting each successive numerical value into corresponding analog values of each predistorted channel input signal $x^1(t,\omega_i)$ of the predistorted electrical signal $X^1(t)$;

wherein the digital filter comprises a Look-up table comprising:

a serial to parallel converter (SPC) for converting the electrical input signal X(t) into a series of successive N-bit words; and a Random Access Memory (RAM) coupled to receive each N-bit word from the SPC, the RAM being adapted to store a plurality of numerical values of the predistorted electrical signal $X^1(t)$, and output a selected one numerical value based on the N-bit word from the SPC.

11. A system as claimed in claim 10, wherein the processor is implemented remote from the compensation processor.

12. A system as claimed in claim 10, wherein the processor comprises:

a detector for measuring a performance parameter related to the signal distortions due to nonlinear and cross channel effects; and a calculation engine for calculating respective values of one or more parameters of the compensation operator that optimizes the measured performance parameter.

13. A system as claimed in claim 12, wherein the detector is adapted to measure any one or more of:

cross-phase modulation;

self phase modulation;

modulation instability; and cross-talk.

14. A system as claimed in claim 10, wherein the RAM comprises:

a plurality of parallel RAMs; and a digital ADDER for digitally summing the output of each RAM to generate each successive numerical values of the predistorted electrical signal $X^1(t)$.

15. A system as claimed in claim 10, wherein the Random Access Memory (RAM) is coupled to receive a center portion of each N-bit word from the SPC, the RAM being adapted to output a selected one numerical value based on the received center portion of the N-bit word, and wherein the look-up table further comprises:

a respective linear adder tree for digitally summing each end portion of the N-bit word from the SPC;

a first digital ADDER for digitally summing the output of each linear adder tree; and a second digital ADDER for digitally summing the output of the first digital ADDER and the RAM to generate each successive numerical value of the predistorted electrical signal $X^1(t)$.

16. A system as claimed in claim 10, wherein each predistorted channel input signal $x^1(t,\omega_i)$ is represented by a pair of orthogonal components, and the look-up-table comprises a respective look-up-table for generating each component.

17. A system as claimed in claim 10, wherein at least one numerical value of the predistorted signal is extracted from the look-up-table for each N-bit word.

18. A system as claimed in claim 10, wherein the number (N) of bits within each N-bit word is based on any one or more of:

an expected maximum dispersion of the optical communications system; and an expected response time of the look-up-table.

19. A distortion compensator for compensating optical signal distortions due to nonlinear and cross channel effects of an optical communications system, the distortion compensator comprising:

a compensation processor for digitally processing an electrical input signal X(t) comprising at least two parallel channel input signals $x(t,\omega_i)$ using a predetermined complex compensation operator C[(E(t)] to generate a predistorted electrical signal $X^1(t)$ comprising a respective predistorted channel input signal $x^1(t,\omega_i)$ corresponding to each channel input signal $x(t,\omega_i)$, the compensation operator C[E(t)] being the inverse of a link complex non-linear operator T[E(t)] representing one or more signal distortions due to nonlinear and cross channel effects imparted to a Wavelength Division Multiplexed communications signal E(t) as it traverses an optical link of the optical communications system, such that modulation of an optical source using the predistorted channel input signals $x^1(t,\omega_i)$ generates a corresponding predistorted optical channel signals $E(t,\omega_i)$ for transmission through the optical link;

wherein the compensation processor comprises:

a digital filter for filtering the electrical input signal X(t) using the compensation operator C[E(t)] to generate a series of successive numerical values of the predistorted electrical signal $X^1(t)$; and a digital-to-analog converter for converting each successive numerical value into corresponding analog values of each predistorted channel input signal $x^1(t,\omega_i)$ of the predistorted electrical signal $X^1(t)$;

wherein the digital filter comprises a look-up table comprising:

a serial to parallel converter (SPC) for converting the electrical input signal X(t) into a series of successive N-bit words; and a Random Access Memory (RAM) coupled to receive each N-bit word from the SPC, the RAM being adapted to store a plurality of numerical values of the predistorted electrical signal $X^1(t)$, and output a selected one numerical value based on the N-bit word from the SPC.

20. A distortion compensator as claimed in claim 19, wherein the RAM comprises:

a plurality of parallel RAMs; and a digital ADDER for digitally summing the output of each RAM to generate each successive numerical values of the predistorted electrical signal $X^1(t)$.

21. A distortion compensator as claimed in claim 19, wherein the Random Access Memory (RAM) is coupled to receive a center portion of each N-bit word from the SPC, the RAM being adapted to store a plurality of numerical values of the predistorted electrical signal $X^1(t)$, and output a selected one numerical value based on the received center portion of the N-bit word, and wherein the look-up table further comprises:

a respective linear adder tree for digitally summing each end portion of the N-bit word from the SPC;

a first digital ADDER for digitally summing the output of each linear adder tree; and a second digital ADDER for digitally summing the output of the first digital ADDER and the RAM to generate each successive numerical value of the predistorted electrical signal $X^1(t)$.

22. A distortion compensator as claimed in claim 19, wherein each predistorted channel input signal $x^1(t,\omega_i)$ is represented by a pair of orthogonal components, and the look-up-table comprises a respective look-up-table for generating each component.

23. A distortion compensator as claimed in claim 19, wherein at least one numerical value of the predistorted signal is extracted from the look-up-table for each N-bit word.

24. A distortion compensator as claimed in claim 19, wherein the number (N) of bits within each N-bit word is based on any one or more of:

an expected maximum dispersion of the optical communications system; and an expected response time of the look-up-table.

* * * * *